No. 632,096. Patented Aug. 29, 1899.
G. T. BRUCKMANN.
COMPOSITION OF MATTER.
(Application filed Mar. 2, 1899.)
(No Model.)
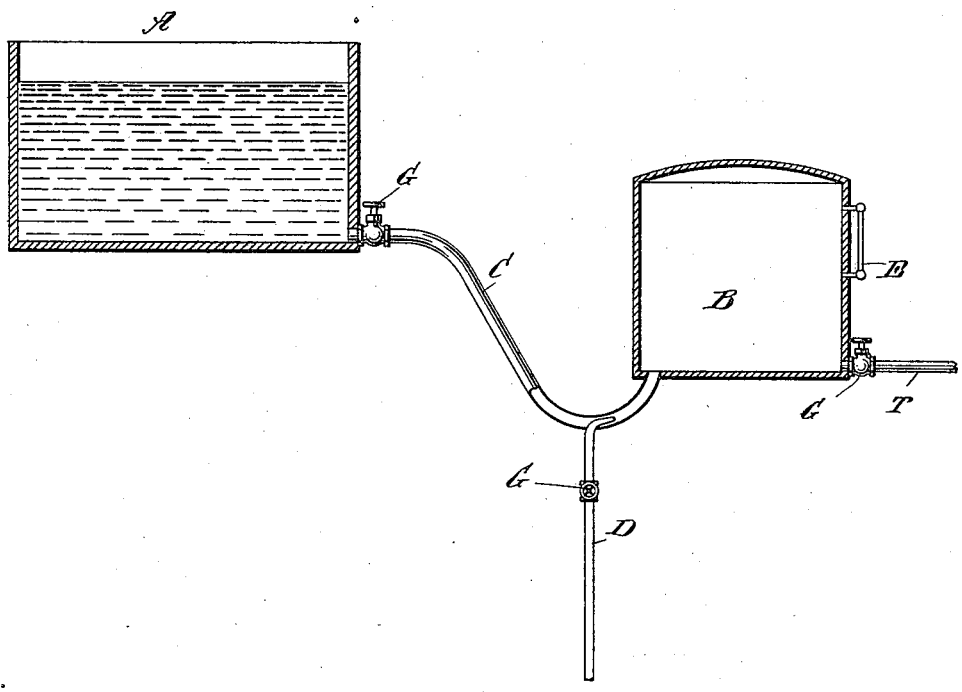
WITNESSES:
Edward Thorpe
John Lotka
INVENTOR
Gustav T. Bruckmann
BY
ATTORNEYS.

UNITED STATES PATENT OFFICE.

GUSTAV T. BRUCKMANN, OF NEW YORK, N. Y.

COMPOSITION OF MATTER.

SPECIFICATION forming part of Letters Patent No. 632,096, dated August 29, 1899.

Application filed March 2, 1899. Serial No. 707,489. (No specimens.)

*To all whom it may concern:*

Be it known that I, GUSTAV T. BRUCKMANN, of the city of New York, borough of Brooklyn, in the county of Kings and State of New York, have invented a new and Improved Composition of Matter Containing Hydrogen Peroxide, of which the following is a full, clear, and exact description.

It is well known that hydrogen peroxide ($H_2O_2$) is a rather unstable compound when preserved alone, being liable to give off a portion of its oxygen, forming water ($H_2O$). To counteract this tendency and to preserve the peroxide in its original purity and concentration, it is customary to add to the peroxide sulfuric acid or phosphoric acid, and it has been found that within certain limits the keeping qualities of the peroxide increase with an increase of the proportion of mineral acid added. In many applications of hydrogen peroxide, however, particularly for medicinal purposes, the addition of a comparatively large amount of mineral acid is objectionable on account of the disagreeable and painful effect it has on organic tissues.

The object of my present invention is to provide a means whereby an oxygenated agent may be added to hydrogen peroxide in sufficiently large quantities to preserve the peroxide effectively without, however, creating the unpleasant sensation above mentioned.

To this end I employ as a preserving agent carbonic acid, which disappears largely at the time the peroxide is used medicinally, and therefore is present in large quantities only just so long as its preserving action is required. As will be further explained hereinafter, the addition of carbonic acid is also advantageous in several other respects.

The invention will now be fully described in its details and the features of novelty will be pointed out in the appended claims.

Any suitable apparatus may be used in carrying out my invention—for instance, the one shown in the accompanying drawing, which is a diagrammatic representation of such apparatus. This apparatus consists of a tank A, adapted to contain the hydrogen peroxide, a closed tank B, which may be termed the "mixing-tank," a pipe C, connecting the two tanks, a pipe D for the supply of carbonic acid either to the tank B direct or to a point of the pipe C, as shown, so that the current of carbonic acid will act on the injector principle to draw a supply of peroxide from the tank A to the mixing-tank B. A gage E is provided on the mixing-tank, also a pipe F, which leads to a bottling apparatus of any suitable construction. Cocks or valves G are provided wherever desirable.

The operation is simply as follows: The carbonic-acid gas ($CO_2$) or its solution in water ($H_2CO_3$) is let into the pipe D and tank B, taking along a supply of peroxide of hydrogen ($H_2O_2$) from the tank A. This is continued until the gage E shows a predetermined amount of pressure—say one hundred and twenty pounds. I desire it to be understood, however, that I may employ a considerably higher pressure, if desired, or a lower pressure. The bottling is performed in any usual manner, so that the mixture of peroxide and carbonic acid is finally stored under pressure in reservoirs or bottles of any approved character—for instance, in bottles of the type known as "siphons."

It will be obvious that as long as the mixture is confined in the receptacle the carbonic acid will be retained therein, preventing a decomposition of the hydrogen peroxide. When, however, as in the case of a medicinal application, the mixture is released into the atmosphere, a very large proportion of the carbonic acid will escape from the mixture owing to the reduction of pressure, and thus the disadvantage of a too great mineral acidity of the liquid at the moment of its application will be avoided, while the keeping of the peroxide is insured by the presence of a comparatively large amount of acid until such time as the liquid is to be used. I therefore obtain peroxide which will keep as well as that mixed with a large proportion of sulfuric acid according to the common method, but which at the time of the application will be materially reduced in acidity and practically neutral, avoiding the unpleasant and undesirable effects due to the addition of a large amount of mineral acids which remain permanently admixed with the peroxide.

I have found that the mixture of carbonic acid with peroxide of hydrogen is further superior to that of mineral acids with said agent in the following additional respects: The peroxide is broken up into small particles by the liberated carbonic-acid gas and on account of this acts much more quickly upon organic tissues. The froth, which is a characteristic effect of hydrogen peroxide, forms much more quickly with my improved mixture than with all others known to me. The unpleasant coagulating action on albumen, which is observed with hydrogen peroxide prepared according to the usual methods, is done away with by my invention. The taste of the liquid is much more pleasant, and no sour effect is experienced. When taken internally as an aid to digestion, the action is much quicker and more agreeable. Some of these advantages obviously will be obtained whether the carbonic acid be admixed under pressure or not; but the application of pressure secures the release at the proper time of that portion of the acid which may be termed the "preserving" portion and breaks up the liquid, as above mentioned, producing also a cooling effect. Furthermore, a liquid stored under pressure may be readily discharged in any desired direction by means of a siphon or other well-known devices. I have also found that hydrogen peroxide prepared according to my method will bleach much more quickly than peroxide prepared according to the usual methods.

It will be observed that while I may utilize the pressure of carbonic acid to eject the peroxide from a siphon my invention does not reside in this feature, but in the admixture of carbonic acid to hydrogen peroxide instead of the mineral acids usually employed, with the advantages fully explained in the foregoing description.

I desire it to be understood that carbonic acid may be employed to acidify hydrogen peroxide in conjunction with the mineral acids hitherto employed. Thus hydrogen peroxide may be acidified with a comparatively small quantity of phosphoric acid, (sufficiently small to avoid the defects hereinbefore pointed out of the use of a large quantity of mineral acid,) and then carbonic acid may be added in sufficient quantity to preserve the peroxide, as above described. Of course various ingredients might be added without sacrificing the advantages explained, and therefore without departing from the nature of my invention.

It will be understood that by the term "hydrogen peroxide" I do not necessarily refer to the chemically pure substance, but chiefly to the commercial form thereof, which is an aqueous solution.

Having thus described my invention, I claim as new and desire to secure by Letters Patent—

1. A mixture consisting essentially of peroxide of hydrogen and carbonic acid.

2. A mixture consisting essentially of peroxide of hydrogen and carbonic acid under pressure.

GUSTAV T. BRUCKMANN.

Witnesses:
 JOHN LOTKA,
 E. B. MARSHALL.